F. W. KITTLINGER.
LOCKING LAST.
APPLICATION FILED JAN. 20, 1909.
935,995.
Patented Oct. 5, 1909.
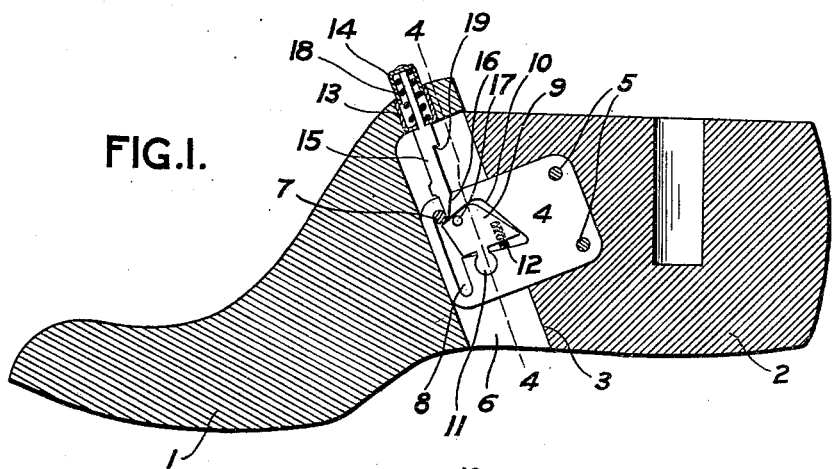
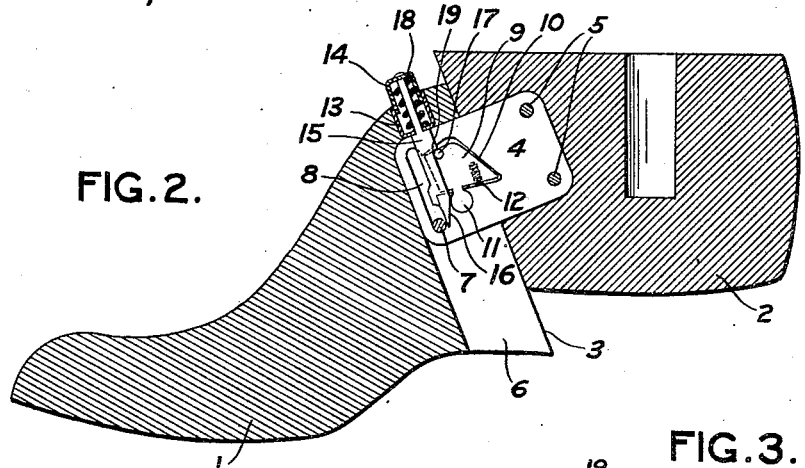
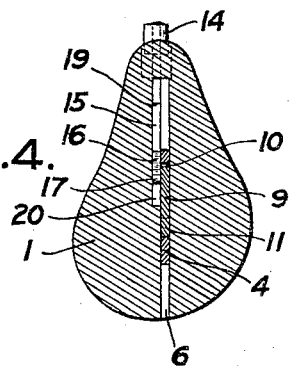
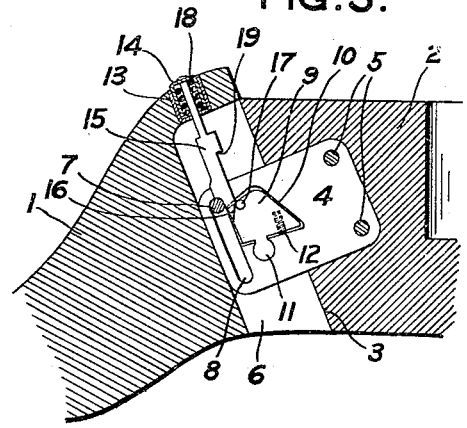
WITNESSES:
L. Thow
C. W. Carroll
INVENTOR:
Frederick W. Kittlinger

UNITED STATES PATENT OFFICE.

FREDERICK W. KITTLINGER, OF ROCHESTER, NEW YORK.

LOCKING LAST.

935,995.

Specification of Letters Patent.

Patented Oct. 5, 1909.

Application filed January 20, 1909. Serial No. 473,379.

*To all whom it may concern:*

Be it known that I, FREDERICK W. KITTLINGER, a citizen of the United States, and resident of Rochester, in the county of Monroe and State of New York, have invented certain new and useful Improvements in Locking Lasts, of which the following is a specification.

This invention relates to locking lasts, and has for its object simplicity, cheapness and ease of operation.

A novel feature of the invention lies in the fact that the last is automatically locked in the extended position, and may be unlocked by pressure upon a push-button.

In the drawings:—Figure 1 is a longitudinal section of a last embodying this invention, the parts occupying the lengthened or lasting position; Fig. 2 is a similar view, but showing the parts unlocked and in the shortened position; Fig. 3 is a partial sectional view showing the parts unlocked but still in the lengthened position; and Fig. 4 is a cross-section on the line 4—4 of Fig. 1.

The last has a toe-part 1 and a heel-part 2, which slide on oblique meeting faces at 3 for lengthening and shortening the last. Said heel-part carries a plate 4, fixed thereto by pins 5, and said plate extends into a vertical groove 6 in the toe-part 1. A cross pin 7 in the toe-part extends through a slot 8 in the plate 4, and so permits the latter to slide in the groove 6, but prevents the heel-part and the toe-part from being moved relatively to each other except along the meeting-faces 3. The groove 6 fits the plate 4, and the slot 8 is parallel to the meeting faces 3.

A dog, consisting of a spring-pressed plate 9, comprises means for automatically locking the last in the extended position (Fig. 1). Said dog 9 lies within an aperture 10 in the plate 4, adjacent to and connecting with the slot 8, and said dog is pivoted to the plate at 11. A spring 12 socketed within the body of the dog 9 and resting upon the lower edge of the aperture 10, presses upon the said dog at all times, so that the upper forward corner thereof is thrown under the pin 7, and locks the pin in the end of the slot 8. It is obvious that with the dog 9 in this position, the last is in the lengthened position and the heel-part 2 cannot be moved upward along the face 3. Therefore means are provided whereby the said dog may be moved out of engagement with the underside of the pin 7, thus constituting releasing means for tilting the dog and unlocking the parts of the last.

In the upper rear end of the toe-part 1 is a socket 13, in which a finger-button 14 is slidably supported. Extending downwardly from the latter is a rod or bar 15, the lower end of which is wedge-shaped and has a face 16 at an angle with the axis of the socket 13. Said wedge end, when the button 14 is depressed, moves downward behind the pin 7, and the face 16 strikes a lateral projection or stud 17 on the dog 9, and so pushes the latter backward and away from the pin 7, (Fig. 3). The heel-part 2 may then be moved upward to the shortened position of the last shown in Fig. 2.

Normally, the bar 15 is returned to the position shown in Fig. 1, by the action of a spring 18 that lies within the socket 13 and presses upward upon the button 14. If the spring fails to act from loss of elasticity or other cause, the bar 15 is returned positively to the normal position by the stud 17 which strikes a shoulder 19 on said bar when the heel-part 2 is nearly at its upper limit of movement, (Fig. 2). When the heel-part 2 is returned to its lower limit of movement, (Fig. 1) and the bar 15 is held up by the spring 18 as aforesaid, the dog 9 is pushed under the pin 7 by the action of the spring 12. Thus the last is locked automatically in the extended position.

By reference to Fig. 4, it will be observed that the bar 15 lies adjacent to the plate 4 and in a plane parallel thereto to accommodate said bar and also the lateral projection or stud 17. A separate recess 20 is formed in the toe-part 1, corresponding to the movement of the stud 17; but said recess is of less extent longitudinally and vertically than the groove 6 that receives and guides the plate 4.

What I claim is:—

1. In a last, a heel part and a toe part sliding on each other to lengthen and to shorten the last, and having a vertical groove in the meeting face of one part; a plate fixed to the second part and projecting into said groove, and having a slot parallel with said meeting face; a cross-pin in the first part passing through the slot; and a tilting dog carried by the plate, and adapted to engage the pin to lock it in the end of the slot to hold the two last parts in the lengthened position.

2. In a last, a heel part and a toe part sliding on each other to lengthen and to shorten the last, and having a vertical groove in the meeting face of one part; a plate fixed to the second part and projecting into said groove, and having a slot parallel with said meeting face and an aperture adjacent to and connecting with the slot; a cross-pin in the first part passing through the slot; and a tilting dog held in said aperture, and adapted to engage the pin to lock it in the end of the slot to hold the last parts in the lengthened position.

3. In a last, a heel part and a toe part sliding on each other to lengthen and to shorten the last, and having a vertical groove in the meeting face of one part; a plate fixed to the second part and projecting into said groove, and having a slot parallel with said meeting face; a cross-pin in the first part passing through the slot; a tilting dog carried by the plate, and adapted to engage the pin to lock it in the end of the slot to hold the two last parts in the lengthened position; and releasing means carried by one of said last parts for tilting the dog and unlocking the parts.

4. In a last, a heel part and a toe part sliding on each other to lengthen and to shorten the last, and having a vertical groove in the meeting face of one part; a plate fixed to the second part and projecting into said groove, and having a slot parallel with said meeting face and an aperture adjacent to and connecting with the slot; a cross-pin in the first part passing through the slot; a tilting dog held in said aperture, and adapted to engage the pin to lock it in the end of the slot to hold the last parts in the lengthened position; and releasing means carried by one of said last parts for tilting the dog and unlocking the parts.

5. In a last, a heel part and a toe part sliding on each other to lengthen and to shorten the last, and having a vertical groove in the meeting face of one part; a plate fixed to the second part and projecting into said groove, and having a slot parallel with said meeting face; a cross-pin in the first part passing through the slot; a tilting dog carried by the plate, and having a lateral projection, and adapted to engage the pin to lock it in the end of the slot to hold the last parts in the lengthened position; and releasing means carried by one of said parts for engaging said lateral projection to tilt the dog and unlock the parts.

6. In a last, a heel part and a toe part sliding on each other to lengthen and to shorten the last, and having a vertical groove in the meeting face of one part; a plate fixed to the second part and projecting into said groove, and having a slot parallel with said meeting face and an aperture adjacent to and connecting with the slot; a cross-pin in the first part passing through the slot; a tilting dog held in said aperture, and having a lateral projection, and adapted to engage the pin to lock it in the end of the slot to hold the last parts in the lengthened position; and releasing means carried by one of said parts for tilting the dog and unlocking the parts.

7. In a last, a heel part and a toe part sliding on each other to lengthen and to shorten the last, and having a vertical groove in the meeting face of one part; a plate fixed to the second part and projecting into said groove, and having a slot parallel with said meeting face; a cross-pin in the first part passing through the slot; a tilting dog carried by the plate, and adapted to engage the pin to lock it in the end of the slot to hold the two last parts in the lengthened position; and a spring-returned releasing bar carried by one of said last parts for tilting the dog and unlocking the parts.

8. In a last, a heel part and a toe part sliding on each other to lengthen and to shorten the last, and having a vertical groove in the meeting face of one part; a plate fixed to the second part and projecting into said groove, and having a slot parallel with said meeting face; a cross-pin in the first part passing through the slot; a tilting dog carried by the plate, and having a lateral projection and adapted to engage the pin to lock it in the end of the slot to hold the last parts in the lengthened position; and a spring-returned releasing bar carried by one of said parts for engaging said lateral projection to tilt the dog and unlock the parts.

9. In a last, a heel part and a toe part sliding on each other to lengthen and to shorten the last, and having a vertical groove in the meeting face of one part; a plate fixed to the second part and projecting into said groove, and having a slot parallel with said meeting face; a cross-pin in the first part passing through the slot; a tilting dog carried by the plate, and having a lateral projection, and adapted to engage the pin to lock it in the end of the slot to hold the last parts in the lengthened position; and a spring-returned wedge bar carried by one of said parts for engaging said lateral projection to tilt the dog and unlock the parts.

10. In a last a heel part and a toe part sliding on each other to lengthen and to shorten the last, and having a vertical groove in the meeting face of one part; a plate fixed to the second part and projecting into said groove, and having a slot parallel with said meeting face; a cross-pin in the first part passing through the slot; a tilting dog carried by the plate, and adapted to engage the pin to lock it in the end of the slot to hold the two last parts in the lengthened position; a bar carried by one of said parts for tilting the dog and unlocking the parts; and means for returning said bar to its initial position by the relative movement of the last parts to shorten the last.

11. In a last, a heel part and a toe part sliding on each other to lengthen and to shorten the last, and having a vertical groove in the meeting face of one part; a plate fixed to the second part and projecting into said groove, and having a slot parallel with said meeting face; a cross-pin in the first part passing through the slot; a tilting dog carried by the plate, and having a lateral projection, and adapted to engage the pin to lock it in the end of the slot to hold the last parts in the lengthened position; a reciprocating bar carried by one of the parts for engaging said lateral projection to tilt the dog and unlock the parts; and a projection on said bar engaged by said dog upon relative movement of the last parts to shorten the last, whereby the bar is returned to its initial position.

FREDERICK W. KITTLINGER.

Witnesses:
   GEORGE F. SCHELTER,
   D. GURNEE.